United States Patent [19]

McCarthy

[11] Patent Number: 4,967,820
[45] Date of Patent: Nov. 6, 1990

[54] WHITE SIDEWALL RADIAL TIRES AND METHOD FOR THEIR MANUFACTURE

[75] Inventor: Robert A. McCarthy, Northford, Conn.

[73] Assignee: Pirelli Armstrong Tire Corporation, New Haven, Conn.

[21] Appl. No.: 285,350

[22] Filed: Dec. 14, 1988

Related U.S. Application Data

[63] Continuation of Ser. No. 57,299, May 26, 1987, abandoned.

[51] Int. Cl.$^5$ .................... B60C 13/02; B60C 13/04; B29B 35/00
[52] U.S. Cl. .................... 152/524; 152/523; 152/DIG. 12; 156/116; 51/106 R; 51/DIG. 33
[58] Field of Search ............. 156/116; 152/523, 524, 152/525, DIG. 12; 51/DIG. 33, 104, 106 R

[56] References Cited

U.S. PATENT DOCUMENTS

| | | | |
|---|---|---|---|
| 1,448,286 | 3/1923 | Comstock | 152/DIG. 12 X |
| 3,365,345 | 1/1968 | Cooper et al. | 156/116 |
| 3,594,248 | 7/1971 | Sjoberg | 156/116 |
| 3,729,041 | 4/1973 | Kubota | 152/524 X |
| 3,830,274 | 8/1974 | Waser, Jr. | 152/DIG. 12 X |
| 4,177,233 | 12/1979 | Roberts, Jr. | 156/116 X |
| 4,663,889 | 5/1987 | Strand et al. | 51/106 R |

FOREIGN PATENT DOCUMENTS 1017464  1/1966  United Kingdom ............... 156/116

*Primary Examiner*—Robert A. Dawson
*Assistant Examiner*—Gregory J. Wilber
*Attorney, Agent, or Firm*—St. Onge Steward Johnston & Reens

[57] ABSTRACT

A white sidewall band for radial ply tires consisting of upstanding wall areas extending axially outward from surrounding sidewall areas and having white rubber disposed radially across the width of the band and recessed axially inward from one wall area to the other. Sidewalls of this type can be made using buffing stones having buffing surfaces of convex cross-section, and result in white sidewalls protected from dirtying during transportation, storage, and the like without introducing structural weakness in the sidewall area.

11 Claims, 3 Drawing Sheets and more particularly to white sidewall tires of the radial-ply type.
WHITE SIDEWALL RADIAL TIRES AND METHOD FOR THEIR MANUFACTURE This is a continuation of U.S. co-pending application Ser. No. 07/057,299 filed on May 26, 1987, now abandoned.

BACKGROUND OF THE INVENTION

The present invention relates to white sidewall tires and a method for their manufacture, and more particularly to white sidewall tires of the radial-ply type.

In the known procedures for applying a decorative annular white band or strip on the outer-facing sidewall area of a tire whose reinforcing carcass structure is of the bias-ply type, the tire is built up with appropriate reinforcing plies, and elastomer covering strips are used to form sidewall and tread areas. At a preselected annular area on the sidewall, pigmented white elastomer is arranged which is overlayed with black elastomer. Typically, the pigmented white elastomer and black elastomer are preformed (e.g., by extrusion) as a composite strip which can be generally annularly arranged about the sidewall in one or a number of pieces, and most typically the preforming is of a sandwich-type composite comprised of black elastomeric base, overlaying white pigmented elastomer and overlaying black elastomer. The white pigmented portion of the composite (indeed the entire composite) generally is substantially wider than the eventual intended white sidewall strip in the finished tire.

The tire built up in this fashion is cured or vulcanized, with the result that the composite annular strip becomes an integral part of the sidewall of the tire, and the mold in which the tire is cured is configured so as to result in a portion of the composite strip being raised above the surface of the neighboring sidewall areas. The tire is then mounted on a rotating device so as to be outer-facing, and cutting blades are then arranged at the sidewall area where the composite strip exists. Opposed cutting blades are spaced apart a predetermined distance so as to define the width of the desired decorative white sidewall area and adjusted to achieve a cutting depth which will expose the white pigmented portion of the sidewall. As the tire rotates in contact with the blades, an annular ring consisting of covering black rubber and a small portion of underlying white rubber is removed, leaving in the sidewall area a decorative, defined, annular white ring recessed from the tire sidewall surface, i.e., in the nature of a groove. Owing to the recessed nature of the white sidewall area, the white sidewall generally is found to resist scuffing or dirtying as tires are stacked one upon the other or one next to the other for transportation, storage, and the like.

As the art and consumers moved progressively to wide-scale acceptance of tires of the radial-ply rather than bias-ply type, it became apparent that the known methods for providing decorative white sidewalls on bias-ply tires could not be employed for radial tire designs. In particular, it was unacceptable to cut into the sidewall area to expose a recessed area of the white rubber, for to do so would introduce a potential failure point in the tire inasmuch as the tire is deliberately constructed to flex radially.

In providing decorative white sidewalls on radial tires, then, the art developed a procedure wherein a composite strip of white elastomer covered by a thin black elastomer veneer (and generally overlaying a black elastomeric base as in the sandwich-type arrangement previously discussed) is arranged generally annularly about the sidewall area. Upon curing in a suitable mold, the composite becomes integrally associated with the sidewall area and the mold configuration is such that a predetermined width of the annular composite, eventually defining the general white sidewall width, is slightly raised above the surface of the surrounding sidewall areas. In the next step, the tire is mounted, outer-facing, on a rotating device and one or more circular buffing stones, rotating in a plane generally perpendicular to the plane of rotation of the tire, and whose buffing surfaces are at least as wide as the predetermined width of the protruding sidewall area, are placed in contact with the raised sidewall strip. As the tire and stones rotate in their respective planes, the thin black rubber veneer covering the underlying white rubber is buffed off to expose an annular decorative white sidewall strip. Generally, the surface of the buffing stone is flat or even slightly concave such that the cross-sectional shape of the exposed surface of the white sidewall strip is either flat or slightly convex. In the finished form, the white sidewall strip remains slightly raised above the surrounding sidewall surface, a necessary requirement in order to attain a clearly and sharply defined white sidewall.

As a consequence of the process required for providing white sidewalls on radial tires, i.e., resulting in a raised annular white area, it is found that the white sidewalls are quite prone to scuffing and dirtying in the normal course of, e.g., transportation and storage of the tires. While removable protective covers or removable pigmented protective solutions can be applied to the whitewall strip, this introduces yet another step in the overall process and detracts, at least until removed, from the aesthetic effect sought to be obtained from the whitewall.

SUMMARY OF THE INVENTION

In view of the foregoing, it is an object of this invention to provide a tire of the radial-ply type having a clearly defined annular white sidewall area but which is less susceptible to scuffing or dirtying in the course of manufacturing, handling, transportation, storage and the like than is the case for existing radial tires.

Another object of the invention is to provide an economical process for manufacturing a clearly defined annular white sidewall strip on a radial tire.

These and other objects are achieved by the provision of an annular white sidewall strip on the outer-facing side of a radial tire, which strip is formed in a manner so as to be raised above the surface of the surrounding sidewall areas and yet possess general cross-sectional concavity. As a result of this configuration, the white strip is disposed concavely (i.e., recessed) between two upstanding ribs of black rubber across the width of the annular band and, thus, is protected from the scuffing and dirtying which would be encountered, e.g., as tires are stacked one upon the other or one beside the other, the ribs serving to maintain abutting tire surfaces spaced apart from the white strip area.

The tires of the present invention can be manufactured according to processes similar to those heretofore known, with the important exception of utilizing circular buffing stones whose tire engaging surfaces are convex in cross-sectional shape. As is further described hereinafter, other process variations may be practiced.

The invention will be more easily understood with reference to the following detailed description and the appended drawings. For ease of the description, reference is made to provision of white sidewall strips on black tires, although the present invention is equally applicable to provision of a sidewall strip of any distinct color which might be desired.

DETAILED DESCRIPTION OF THE INVENTION

Figure 1:
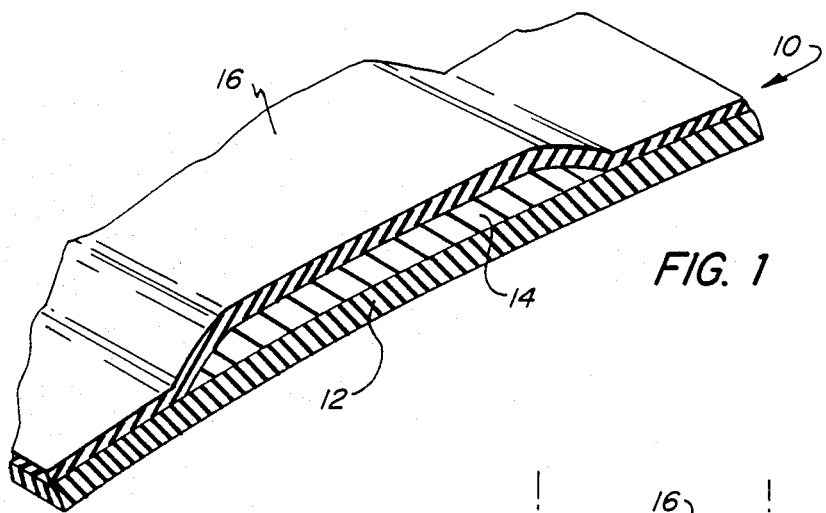
FIG. 1 is a cross-sectional view of a composite elastomer strip used in the prior art for sidewall areas and which can be employed in making white sidewalls of the present invention.

As shown in FIG. 1, a known means for providing whitewalls on radial tires begins with a strip 10 consisting of a composite, sandwich-type arrangement of black elastomer base 12, intermediate elastomer 14 which has been pigmented white and black elastomer veneer 16. The dimensional relationships shown in the drawing are exaggerated for illustration purposes and are not to precise scale; generally veneer 16 is made to be as thin as possible while still affording protection to the underlying white elastomer 14 during formation of strip 10, its application to a tire sidewall and eventual curing with the tire. The composite may be formed by a co-extrusion or molding processes as known in the art.

Figure 2:
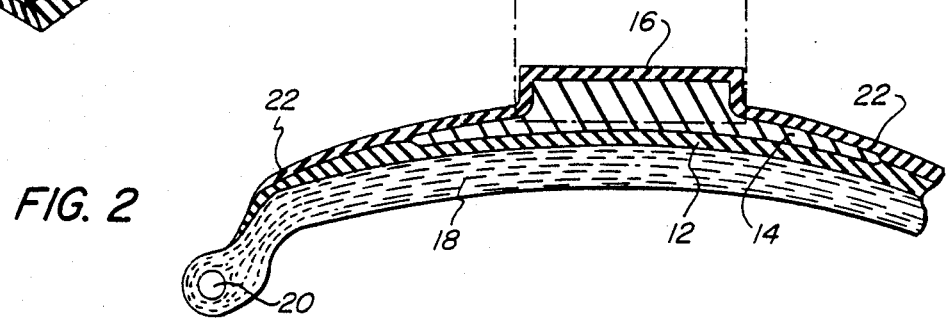
FIG. 2 is a fragmentary cross-sectional view of a tire sidewall area after application of the composite strip of FIG. 1 and curing of the tire.

In building up a radial tire in the uncured state, plies of reinforced elastomer are arranged radially about generally inextensible annular beads (see, e.g., 20 in FIG. 2) to form a reinforcing carcass, and elastomeric strips then overlayed over this carcass to serve as sidewall and tread areas. In building radial tires intended to have defined white sidewall areas, a portion of one side of the tire has its sidewall built up with elastomer including the composite strip 10 arranged, in one or a number of pieces, in generally regular annular configuration. When the tire is then cured in a mold, the composite strip 10 becomes an integral part of the sidewall area. The mold is configured so as to leave the veneer and a portion of the white elastomer of the composite 10 raised slightly above (i.e., axially outward from) the surrounding sidewall surfaces. As can be seen in FIG. 2, representing the outer-facing sidewall area of a cured tire, the composite 10 becomes integrally associated with the tire such that base elastomer 12 generally melds into the rubber 18 of plies or sidewall strips in this area, white elastomer 14 occupies a defined area on the sidewall, and black veneer 16 overlies the white rubber 14 and is melded into surrounding sidewall strips 22. As shown, a portion of white rubber 14 and its overlying black veneer 16 are raised above (axially outward of) the surface of surrounding sidewall areas 22 so as to define the area of the eventual raised white sidewall.

As utilized herein, axial directions are measured in a direction transverse to the rotational plane of the tire, and in the direction of the circumferential center line of the tire (e.g., a line about the tire periphery dividing the tread portion in two equal halves). Thus, for example, with reference to FIG. 2, black veneer 16 is axially outward of surrounding sidewall areas 22 and white rubber 14, while white rubber 14 is axially inward of black veneer 16. Radial directions are measured generally parallel to the rotational plane of the tire in the direction from bead to tread. Thus, for example, with reference to FIG. 2, the sidewall strip (14,16) is radially outward of the bead 20 and radially inward of the tread area (not shown).

As earlier noted, the provision of a clearly defined annular white sidewall band of predetermined band width from the cured tire shown in FIG. 2 could theoretically be achieved in the same manner as in previous bias-ply tire processes by rotational cutting on either side of the raised area (as shown by the dotted lines in FIG. 2) to a depth extending into the white rubber area, having the result of exposing an annulus or circular groove of white rubber recessed below the surrounding sidewall surfaces 22. However, cutting in this manner would introduce a weakness or failure area in a radial-ply tire. As a consequence, manufacturers of radial-ply tires resort to a process, as earlier noted, wherein the tire is rotated in contact with a rotating buffing stone which is in contact with the sidewall area to buff away thin black veneer 16 and expose a defined width of white rubber 14. The buffing cannot extend down (axially inward) to the surrounding sidewall surfaces 22 since, although this too would expose white rubber 14, it would not provide the aesthetically desired clear and definite white sidewall (i.e., sharp boundary between white sidewall and surrounding black sidewall). The buffing, then, is designed to remove the black veneer 16 and no more underlying white rubber than would result in the white sidewall being raised axially outward of the surrounding sidewall surface.

Figure 3A:
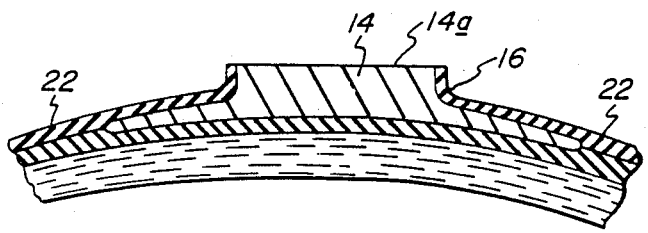
FIGS. 3A and 3B are fragmentary cross-sectional views of a finished tire sidewall area showing the white sidewall strip of, respectively, the prior art and the present invention.

As shown in FIG. 3A, the white sidewall of prior art radial-ply tires assumes a configuration wherein the exposed white rubber surface 14a is generally flat (relative to its own cross-section) and may even be slightly convex so as to follow the curved nature of the overall sidewall area 22, all as a consequence of using buffing stones whose buffing surfaces are similarly flat in cross-section or slightly concave. The upstanding walls of the white rubber strip retain black veneer 16 so as to provide the desired sharply defined white sidewall.

In the preferred embodiment of the radial-ply tire of the present invention, a buffing stone is used whose buffing surface is convex in cross-section. In removing black veneer 16 during the buffing operation using stones of this type, there results an exposed white sidewall area in which the exposed white rubber surface 14a is concave relative to its own cross-section. As a consequence, the upstanding walls of the sidewall strip, consisting of unremoved black veneer 16, serve as ribs 24 between which the exposed white rubber surface 14a is disposed concavely axially inward thereof. The ribs 24 serve to buffer and protect white rubber surface 14a as finished tires are stacked or handled in manufacture, transportation and storage.

Figure 4:
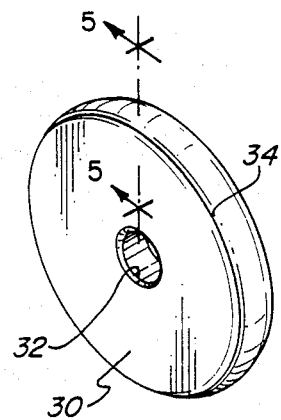
FIG. 4 is a perspective view of a buffing stone, useful for producing sidewalls according to the present invention.
Figure 5:
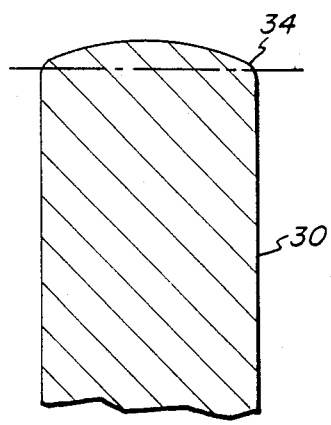
FIG. 5 is a cross-sectional view, generally along 5—5 of FIG. 4, of the buffing stone of FIG. 4.

As noted, one means for providing concavity or recess in the exposed white rubber sidewall surface is through utilization of a buffing stone having a convex buffing surface. As shown in FIGS. 4 and 5, buffing stone 30 consists of a circular element rotatable (e.g., in the direction shown by the arrow) about an axis through centrally disposed hole 32. The outer facing, buffing surface 34 of the stone is formed of or provided with material or particles sufficiently abrasive to effect removal of black veneer and a portion of underlying white rubber without leaving jagged or pitted exposed surfaces. The stone 30 may be made of a single material suitable for such purpose or may be made of a base material on which materials suitable for buffing are provided about the peripheral surfaces. In cross-section, the buffing surface 34 is convex and has a rubber engaging surface width dimensioned as appropriate for the desired white sidewall width. The radius of curvature of the convex buffing surface 34 is chosen as appropriate for the desired and intended radius of curvature of the eventual exposed concave white sidewall.

Figure 3B:
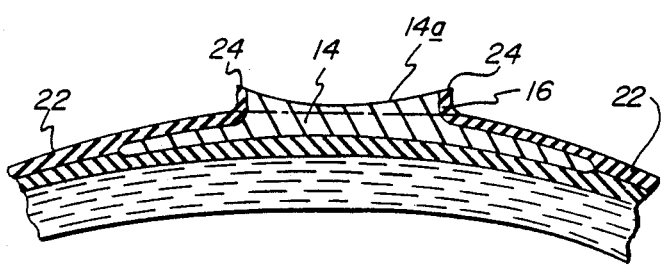

The axially inward depth of the concave white sidewall surface 14a is a function both of the radius of curvature of the buffing surface 34 and the buffing operation itself (applied pressure, length of time, etc.). As shown in FIG. 3B, these conditions preferably are chosen so that the depth of the deepest axially inward portion of the concavely recessed white sidewall surface 14a is at most the same axially inward distance where the surrounding sidewall areas 22 would be if extended in the white sidewall area, as shown, e.g., in the dotted line of FIG. 3B, so as to avoid introducing a potential tire weakness or failure point in the sidewall area. The radius of curvature of buffing surface 34 will be chosen, then, as appropriate for meeting this preferred criteria. Although this construction and mode of operation is preferred, it is not necessarily critical, i.e., the deepest axially inward portion of the exposed, concavely-recessed white sidewall surface 14a can in fact extend axially inward beyond the plane of the surrounding sidewall surfaces without necessarily introducing a potential weakness in the sidewall area, particularly given the smoothness (i.e., absence of sharp corners) of the recessed white sidewall surface achievable using buffing stones rather than cutting blades.

Figure 6:
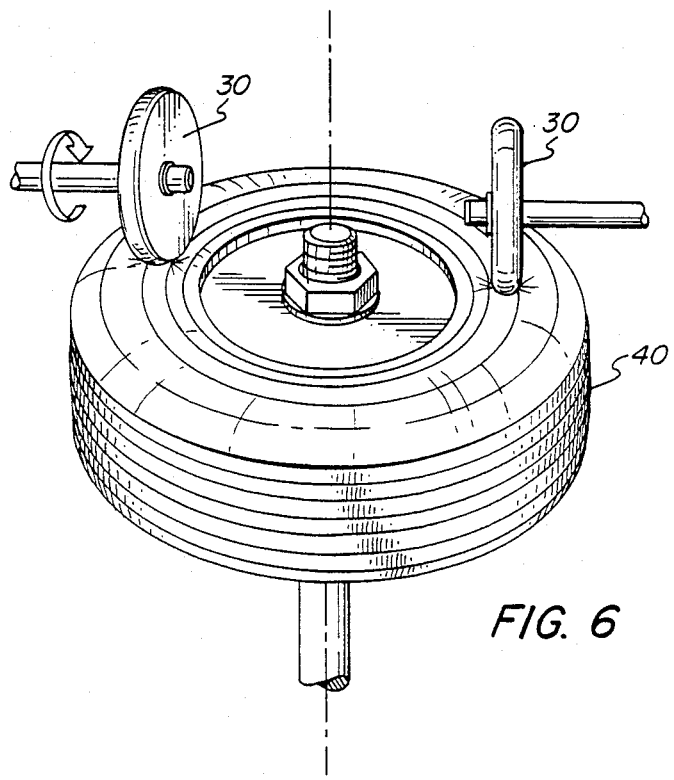
FIG. 6 is a schematic illustration of an apparatus used for buffing sidewall tire areas to produce a white sidewall.

FIG. 6 illustrates, in schematic, the buffing of a tire to expose a defined white sidewall possessing concavity. The tire 40 is mounted on a device which rotates (or permits rotation of) the tire about its central axis. Buffing stones 30 are mounted on axes generally perpendicular to the central axis of the tire so that the rotational plane of the stones is generally perpendicular to that of the tire. The stones are positioned with appropriate pressure in contact with the sidewall area of the tire, and the stone and tire rotation result in a buffing off of black veneer, and generally a portion of the underlying white rubber, so as to produce a sidewall wherein an exposed annular white surface is disposed concavely between two circular ribs or walls.

Figure 7A:
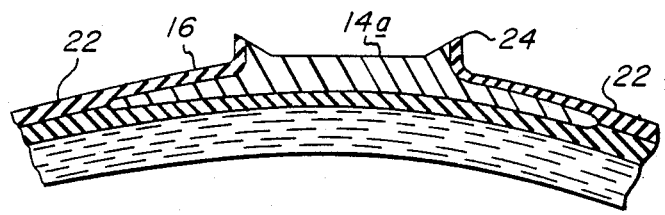
FIGS. 7A, 7B, 7C and 7D are fragmentary cross-sectional views of tire sidewall areas having white sidewall strips produced according to alternative embodiments of the present invention.
Figure 7B:
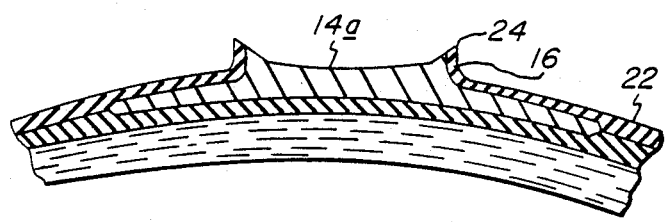

The essential requirement of the present invention is the provision of an annulus of defined band width, generally concentric, about the tire, with the circumferential tread and bead areas, and radially between the two, comprised of white rubber disposed in generally concave recess between upstanding ribs forming side walls of the annulus. As shown in FIG. 3B, in the preferred embodiment of the invention the concavity of the white rubber area is a smoothly curved surface between the ribs having a single defined radius of curvature. In alternative embodiments, other generally concave, or recessed, surfaces can be provided. As shown for example, in FIGS. 7A and 7B, the concavity can assume a less smoothed configuration. In FIG. 7A, for example, is shown an exposed white sidewall surface 14a disposed in recess between ribs 24 in which the most axially inward white surface is generally flat and then either smoothly or sharply curved to meet the ribs. In FIG. 7B, the most axially inward white surface is slightly concave but has a different radius of curvature than that of the white surfaces which meet the ribs. These and other configurations can be achieved by using a suitably dimensioned buffing stone, or preferably, through use of different buffing stones having differing buffing surfaces (e.g., flat, convex of one radius of curvature, convex of a greater or less radius of curvature, etc.).

Figure 7C:
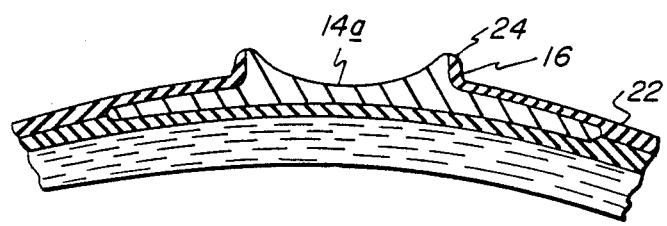
Figure 7D:
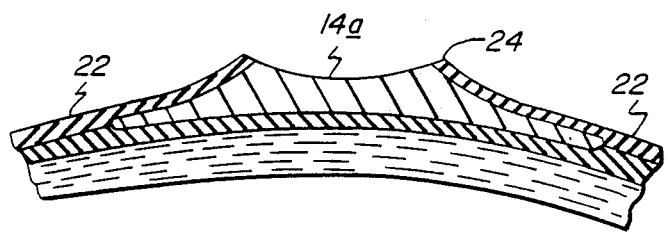

In another alternative embodiment of the invention, the tire produced according to the invention can be further buffed, e.g., with a flat surface buffing stone, so as to produce flattened or rounded edges on ribs 24 as shown in FIG. 7C. In all cases the essential feature of the present invention is maintained, i.e., a defined white rubber annulus about the sidewall tire area comprised of an exposed white rubber surface recessed axially inward, toward the circumferential centerline of the tire, from the plane defined by the black rubber edges or walls of the annulus. As noted, the recess is preferably an axially inward concave surface extending smoothly from one rib to the other across the width of the annulus; however, any recessed configuration can be employed. As shown, e.g., in FIG. 7D, the side walls 24 of the annulus need not be so sharply defined as in FIGS. 7A, 7B and 7C, but rather can be molded so as to be more smoothly blended into surrounding sidewall areas 22.

Figure 8:
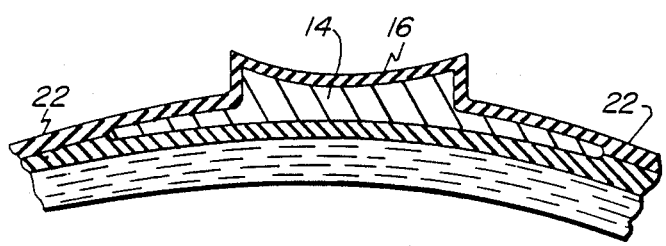
FIG. 8 is a cross-sectional fragmentary view of a tire sidewall area in an "as-molded" configuration especially useful for making white sidewalls according to the invention.

As shown in FIGS. 1 and 2, the tires of the present invention can be made, in their initial steps, utilizing composite rubber strips and tire molds previously employed in the art. Alternatively, however, and as shown in FIG. 8, the tire construction can be such as to provide, as a consequence of composite shape and/or mold configuration, a sidewall annulus already possessing a recessed area of the general width of the intended white recessed area in the final tire. Thus, for example, the sidewall can be molded so as to produce a generally concave recess formed of white rubber 14 and overlying black veneer 16. Utilizing a properly radiused buffing stone surface, the black veneer is then buffed away to leave exposed the recessed white rubber between generally upstanding ribs.

As will be apparent from the foregoing description, numerous embodiments of the invention are possible. Those given are intended to be illustrative rather than limiting, and various other embodiments and modifications are possible without departing from the scope and spirit of the invention as defined in the appended claims.

What is claimed is:

1. In a radial-ply tire having an outer-facing sidewall area on which is provided a distinct annular band of defined width consisting of an exposed continuous white rubber surface disposed between two upstanding walls of black rubber which extend at least slightly axially outward from the sidewall areas of the tire surrounding said annular band, and wherein said continuous white rubber surface is in contact with said upstanding walls at each edge of said white rubber surface, the improvement comprising disposing said continuous white rubber surface such that it is recessed, axially inward, across the width of said annular band from one upstanding wall to the other, and wherein said continuous white rubber surface, across its own width, from each edge thereof in contact with said upstanding side walls, is relatively smoothly contoured in the axially inward direction such that its surface at about the midpoint of said width is concave and is most axially inward relative to the surfaces thereof in contact with said upstanding walls, and wherein said most axially inward concave surface of said continuous white rubber surface is no more axially inward than the general surface plane of said surrounding sidewall areas of the tire.

2. The radial-ply tire according to claim 1 wherein said exposed white rubber surface is curved concavely, according to a single radius of curvature, across the width of said annular band from one upstanding wall to the other.

3. The radial-ply tire according to claim 1 wherein said exposed recessed white rubber surface comprises a generally flat surface at points most axially-inward from said walls.

4. The radial-ply tire according to claim 1 wherein said upstanding walls of said annular band are smoothly blended into said surrounding sidewall areas.

5. In a radial-ply tire having reinforced plies wrapped about generally inextensible beads to form a reinforcing carcass, sidewall areas radially outward of said beads, and a tread portion radially outward of said sidewall areas, and wherein along at least one said sidewall is provided a defined annular band consisting of walls upstanding at least slightly axially-outward of the sidewall areas surrounding said band and an exposed continuous white rubber surface extending radially across the width of said band from a point of contact with one wall to a point of contact with the other wall, the improvement comprising contouring said exposed continuous white rubber surface axially inward across the width of said band from one wall to the other such that the portion of said continuous white rubber surface at about the midpoint of its width is concave and is most axially inward relative to the portions of said white rubber surface in contact with said walls, and wherein said most axially-inward concave surface is no more axially inward than the general surface plane of said surrounding sidewall areas of the tire.

6. In a process for providing on a sidewall area of a radial ply tire a distinct annular band of defined width consisting of an exposed white rubber surface disposed between two upstanding walls of black rubber each of white extends at least slightly axially outward from the sidewall areas of the tire surrounding said annular band, wherein there is applied generally annularly about the sidewall area of an uncured tire a layer of white rubber and an overlaying thin layer of black rubber thereover, and wherein said uncured tire is then cured in a mold so as to result in providing, as an integral part of the sidewall of the cured tire, a generally annular band of white rubber having a thin layer of black rubber thereover, said band extending axially outward from the sidewall areas of the tire surrounding said band, and wherein the generally annular band is then contacted with a buffing device to remove at least said thin black layer and produce a distinct annular band of defined radial width consisting of an exposed continuous white rubber surface disposed between two upstanding walls of black rubber extending at least slightly axially outward of the sidewall areas of the tire surrounding said band, and wherein said continuous white rubber surface is in contact with said upstanding walls of black rubber at each edge of said white rubber surface, the improvement comprising contacting said generally annular band with a buffing device which results in removal of at least said thin black layer and disposition of said continuous white rubber surface such that it is substantially continuously contoured, axially inward, across the width of said annular band, from one wall of black rubber to the other such that the portion of said continuous white rubber surface at about the midpoint of its width is concave and is most axially inward relative to the portions of said white rubber surface in contact with said walls, and wherein said most axially-inward concave surface is no more axially inward than the general plane of said surrounding sidewall areas of the tire.

7. The process according to claim 6 wherein said buffing device is a buffing stone comprised of a disc having a buffing surface about its circumferential periphery, said buffing surface having a width approximately that of the desired width of the exposed white rubber portion of said annular band, said buffing surface being convex in cross-section across its width.

8. In a process for providing on a sidewall area of a radial ply tire a distinct annular band of defined width consisting of an exposed white rubber surface disposed between two upstanding walls of black rubber extending at least slightly axially outward from the sidewall areas of the tire surrounding said annular band, wherein there is applied generally annularly about the sidewall area of an uncured tire a layer of white rubber and an overlaying thin layer of black rubber thereover, and wherein said uncured tire is then cured in a mold so as to result in providing, as an integral part of the sidewall of the cured tire, a generally annular band of white rubber having a thin layer of black rubber thereover, said band extending axially outward from the sidewall areas of the tire surrounding said band, and wherein the generally annular band is then contacted with a buffing device to remove at least said thin black layer and produce a distinct annular band of defined radial width consisting of an exposed continuous white rubber surface disposed between two upstanding walls of black rubber extending at least slightly axially outward of the sidewall areas of the tire surrounding said band, and wherein said continuous white rubber surface is in contact with said upstanding walls of black rubber at each edge of said white rubber surface, the improvement comprising contacting said generally annular band with the buffing surface of a buffing device which device is comprised of a buffing stone comprised of a disc having a buffing surface about its circumferential periphery, said buffing surface having a width approximately that of the desired width of the exposed white rubber portion of said annular band, said buffing surface being convex in cross-section across its width, so as to effect removal of at least said thin black layer and disposition of said continuous white rubber surface such that it is concavely recessed across the width of said annular band, from one wall of black rubber to the other.

9. The process according to claim 8 wherein, after buffing with said convex buffing stone, the resulting annular band is buffed in contact with a second buffing stone having a buffing surface which is generally flat in cross-section so as smooth the axially outward areas of said upstanding black rubber walls of said annular band.

10. The process according to claim 8 wherein, either before or after the buffing of said generally annular band with said buffing stone, the generally annular band is buffed in contact with a different buffing stone having a buffing surface also convex in cross-section but said convex surface being defined by a radius of curvature smaller than that of said buffing stone.

11. The process according to claim 8 wherein said generally annular band in said molded and cured tire comprises two upstanding wall areas of black rubber extending at least slightly axially outward of the surrounding sidewall areas of the tire, white rubber disposed across the width of said generally annular band from one upstanding wall area to the other, and a thin black rubber layer overlying said white rubber, said white rubber and its overlying black layer being recessed, axially inward, across the radial width of said generally annular band, from one wall area to the other.

* * * * *